Patented July 14, 1936

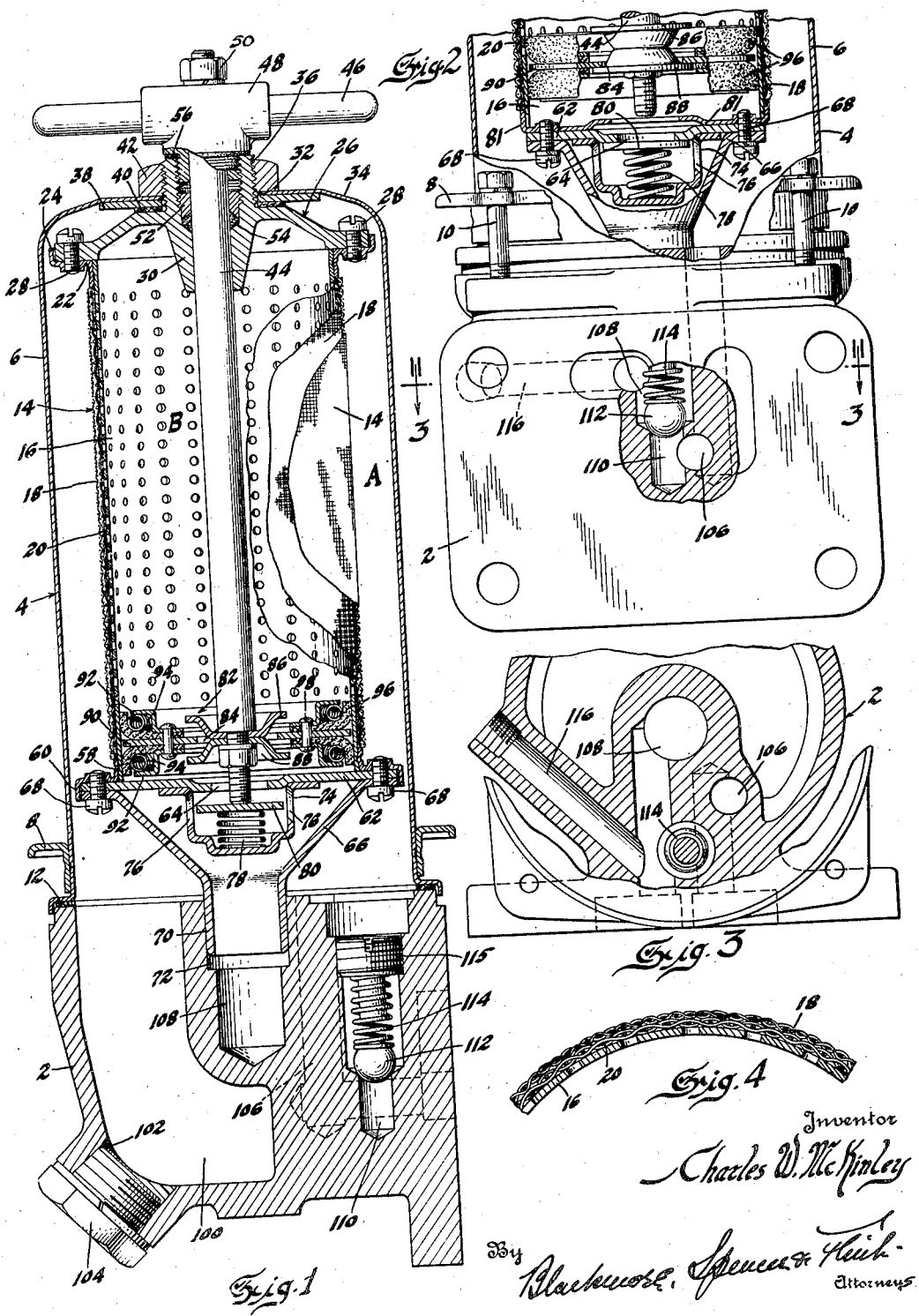
July 14, 1936. C. W. McKINLEY 2,047,793
CLEANABLE OIL FILTER
Filed Aug. 24, 1931

2,047,793

UNITED STATES PATENT OFFICE 2,047,793

CLEANABLE OIL FILTER

Charles W. McKinley, Flint, Mich., assignor, by mesne assignments, to General Motors Corporation, Detroit, Mich., a corporation of Delaware Application August 24, 1931, Serial No. 558,908

9 Claims. (Cl. 210—167)

This invention relates to oil filters and has particular reference to a cleanable oil filter for installation on trucks or heavy duty vehicles.

Trucks or other heavy duty vehicles operating around industrial plants, or in the transportation of earth or other materials likely to create a large amount of dust, will have a large number of impurities gathered in the engine lubricating system. It has therefore been found necessary to install a filter which may be cleaned daily to remove impurities. It is also desirable to have a filter which is capable of having all of the oil of the lubricating system passed therethrough so that the impurities in the oil must reach the filter to be retained thereby.

In the present invention the filter consists of an outer fine screen supported by a coarser screen, both surrounding a perforated cylinder. This unit is housed in a pressed steel shell and supported on a cast iron base. In instances where it is desirable to mount the filter as a part of the engine crank case the cast iron base is not used.

The perforated cylinder contains a piston or plunger, the operating rod of which extends through the top of the pressed steel shell and ends in a handle. The contaminated oil from the engine passes through the filter from the outside to the inside and runs through an opening at the center of the piston. The plunger is loosely mounted on the rod which holds an outflow valve open during the normal operation of the filter.

To clean the filter the engine is stopped and the handle unscrewed and the rod then pulled upward. This upward movement drags the plunger upward and closes the piston passage and the outflow passage. The oil above the plunger will then be forced through the filtering medium in the direction opposite to its normal flow. This will cause the impurities which have collected on the exterior of the filter to be loosened and fall to a sump at the bottom of the housing. The plunger now is forced downward which will force the oil beneath the plunger outward through the filtering screen further to release the impurities. Two or three such upward and downward strokes are ample to clean the filter.

On the drawing:

Fig. 1 is a section view through the filter and base.

Fig. 2 is a view at right angles to Fig. 1 with the bottom shown in section and showing the piston in a slightly raised position.

Fig. 3 is a section on the line 3—3 of Figure 2.

Fig. 4 is a partial sectional view of the filtering medium.

Referring to the drawing, numeral 2 indicates the cast iron base and 4 the filter of the invention. The filter comprises the outer shell or housing 6 having secured thereto at its lower portion the flanged ring 8 by means of which the filter is secured to the base 2 through the bolts 10 which pass through openings in the ring and are screw threaded into the base. The gasket 12 is received between the flanged end of the container 6 and the upper portion of the base 2 to form a liquid tight connection.

The filtering medium or unit is indicated at 14 and comprises the inner perforated cylinder 16, an outer fine screen 18 and the coarser screen 20, the latter being positioned between the perforated cylinder and the fine screen. The parts 16, 18, and 20 are arranged in cylindrical form and shown in Figs. 1 and 4 the finer screen 18 collects and holds the impurities on its surface.

At its upper portion the perforated cylinder 16 has rigidly secured thereto the annular ring 22 having the flange 24. A casting 26 fits in the annular flange and is secured thereto by means of the machine screw 28. The casting 26 has the central boss 30 which projects both above and below the casting. The upper portion of the boss 30 extends through an opening 32 and the top 34 of the shell 6 and is internally and externally screw threaded as shown at 36. A stiffening plate 38 and gasket 40 are positioned between the casting 26 and the interior of the cover 34 while a nut 42 is screwed on to the exterior thread 36 and rigidly holds the casting and filtering until 14 in position. An operating rod 44 extends through the boss and projects outwardly through the cylinder and terminates in a handle 46 mounted by means of the T-head 48 and a nut 50 screw threaded on the end of the rod 44. A nut 52 holds a packing 54 at the bottom of the recessed portion of the boss 30 to form a liquid tight connection between the rod 44 and the interior of the filter. The T-head 48 is screw threaded into the interior threads 36 of the boss and a gasket 56 aids in forming a liquid tight connection.

The lower end of the perforated cylinder 16 has secured thereto the ring 58 which is substantially the same as the ring 22. The ring 58 has the annular flange 60. A plate 62 having central opening 64 fits within the flange of the ring 58 and a lower casting at 66 fits over plate and is held in position on the ring by means of the machine screws 68. The casting 66 is funnel shaped as shown in Fig. 1 and has the neck portion 70 thereof slidably fitting into an opening 72 in the casting 2. The plate 62 has secured thereto the cup shaped member 74 having the oil outlet openings 76. A coil spring 78 is seated in the cup and resiliently urges the valve 80 against its seat to cover the outlet opening 64 in the cause 62.

Fig. 2 shows a slightly modified structure wherein there are eliminated portions of parts 62 and 66 which project beyond the filter. An additional plate 81 is used. This plate is secured to the bottom of the perforated cylinder and rests on the plate 62. This structure eliminates the projecting shelf and easier allows the impurities to fall to the sump 100.

A plunger or piston 82 in the normal operation of the filter rests at the bottom thereof. The piston has the annular central outlet port 84 through which the lower end of the plunger rod 44 passes, in the normal working operation of the filter, the plunger rod end fits and pushes the valve 80 away from its seat as shown in Fig. 1. The lower end of the rod 44 is reduced and has mounted thereon the two cup shaped members 86 and 88 which are larger than the outlet opening 84 and raise or lower the piston 82 when the rod is raised or lowered.

The piston comprises the disc 90 which has the central outlet port 84. The plate 90 also has secured thereto the upper and lower rings 92 which are Z-shaped in cross section and with the aid of the coil springs 94 resiliently press the leather or other suitable soft packing members 96 against the interior of the perforated cylinder 16. The rings 92 and leather packing 96 are secured to the disc 90 by means of the rivets 98.

The lower casting 2 includes the impurity collecting sump 100 the outlet 102 of which is closed by the plug 104. The casting has the inlet passage 106 and the outlet passage 108. The inlet passages are connected by the by-pass passage 110 controlled by a ball valve 112 held on its seat by means of a coil spring 114 and the plug 115.

An additional passage 116 is provided which connects with the outlet 108 and to which an oil gauge or a cloth filter may be attached.

The operation of the filter is as follows: The oil will enter the passage 106 and flow to the interior of the shell 4 into the space A. The pressure of the oil will force the oil through the filtering medium 14, into the space B, the purified oil flowing through the opening 84 in the piston, the opening 64 in the plate 62, through the out flow opening 76 in the cup shaped member 74, and to the outlet passage 108. The impurities in the oil will be collected on the exterior of the fine screen 18 and will form a film thereon. With heavy duty trucks operating in dusty atmospheres the lubricating oil will collect a large amount of impurities and it is considered desirable in modern practice to clean the filter and remove these impurities after each day's run. At the end of the run when the engine is stopped, the operator will unscrew the handle 46 and rod 44 from the internal threads 36, which will free the plunger rod for upward and downward movement. By pulling the rod upward, the lower cup shaped member 88 will close the opening 84 in the piston and cause the piston 82 to move upward with the rod 44. This upward movement will cause the oil confined in the space B inside the filter above the piston to be forced through the filter in the opposite direction. This forced flow of oil will cause the film of impurities on the screen 14 to be freed, and cause them to fall to the bottom of the apparatus into the sump 100. The upward movement of the piston or plunger will create a vacuum therebelow due to the fact that the valve 80 will be forced on its seat by the spring 78. This vacuum will cause the oil to rush through the filter from A to B to the space beneath the piston. When the piston has reached the uppermost limit of its structure, the space B below will be filled with oil and by now forcing the piston downward, a further cleaning is obtained by forcing the oil from the space B to the space A. Two or three such upward and downward movements of the plunger are ample to effect a thorough cleaning of the filter.

In Fig. 2 the piston 82 is shown as slightly raised from the bottom of the filter and also shows the lower cup 88 closing the outflow opening 84 and the spring 78 forcing the valve 80 on its seat.

When the rod 44 has moved the plunger to its downwardmost position the upper cap 86 will be in contact with the disc 90 of the plunger, but the normal pressure of the oil inside the space B will force the piston 82 away from the upper cup 86, or to the position shown in Fig. 1.

I claim:

1. In an oil filter, a container, a filtering means mounted in the container to collect on its surface the impurities in the oil, said oil normally passing through the filtering means from the outside to the inside, means for forcing the oil to flow through the filter from the inside to the outside to clean the filter, comprising a piston having an outlet opening therethrough, and means to close the outlet opening and reciprocate the piston in the filtering means.

2. In an oil filter, a container, a filtering means mounted in the container to collect on its surface the impurities in the oil, means for removing the impurities from the exterior of the filtering means by forcing the oil therethrough in the opposite direction, comprising a piston having a substantially liquid tight contact with the interior of the filtering means, said piston including an opening through which the filtered oil flows, an operating member to reciprocate said piston, a valve controlling the outflow of oil, and means to move said valve to its closed position to close the outlet flow opening when the piston is reciprocated.

3. In an oil filter, a container, a filtering means in said container for collecting on its outer surface the impurities in the oil, means for removing the impurities from the surface of the filter by causing the oil to flow from the inside to the outside of the filter, comprising a piston in the filter, said piston having an oil outflow opening open during the functioning of the filter, means to reciprocate a piston, said means including means to close the piston outflow opening when the piston is moved in either direction.

4. In an oil filter, having an inlet and an outlet, a container, a filtering means in said container for collecting on its outer surface the impurities in the oil, means for removing the impurities from the surface of the filter by causing the oil to flow from the inside to the outside of the filter comprising a piston in the filter, said piston having an oil outflow opening open during the functioning of the filter, means to reciprocate a piston, a valve controlling the outlet, said valve operative to close the outlet when the piston is moved, said reciprocating means including means to close the piston outflow opening when the piston is moved in either direction.

5. In an oil filter, a container, a filtering medium in said container, end walls on said medium, an outlet valve in one of said walls, a spring to urge said valve in one direction, a piston in said medium, means connected to said piston normally holding said valve open against the pressure of the spring, means connected to the piston to enable it to be reciprocated in the medium to cause a reverse flow of oil to clean the filtering medium, said piston permitting said spring to close said valve during the reciprocating movement.

6. In an oil filter, a container, a filtering medium in said container, end walls on said medium, an outlet valve in one of said walls, a piston in said medium, said piston normally holding said valve open, means connected to the piston by which it may be reciprocated in the medium to cause a reverse flow of oil to clean the filtering medium, said piston permitting said valve to close during the reciprocating movement.

7. A filter comprising a casing, a filter unit within said casing dividing the same into inlet and outlet sections, manually operable means for forcing filtered fluid reversely through said filter unit without change in the contents of the casing an outlet port leading from said outlet section, a self-closing valve for said port, and means associated with said manual means for holding said valve open in one position of said manual means.

8. A filter comprising a casing having an outlet port, a filter unit within said casing, pump means for flowing filtered oil reversely through said filter unit, a valve for said outlet port, a reciprocating rod for manually operating said pump means, means for locking said rod, means on said rod engaging said valve to open said outlet port when the rod is locked, and means engaging said valve to close said port when the rod is unlocked.

9. In an oil filter, a container, a filtering medium in said container, a movable piston in said filtering medium, said piston having an opening to allow oil to flow through, means within the opening engaging the periphery thereof but having relative movement with respect to the piston and forming a valve therewith, a reciprocable means extending outside the container secured to the first named means whereby reciprocation of the last named means causes engagement of the first named means with the piston to reciprocate the piston with respect to the filtering medium to cause the oil to flow in a reverse direction through the medium to clean the medium, the opening in said piston being closed by the relative movement between the piston and engaging means during the operation of the reciprocating means.

CHARLES W. McKINLEY.